United States Patent
Sharma et al.

(10) Patent No.: US 11,526,999 B2
(45) Date of Patent: Dec. 13, 2022

(54) OBJECT TRACKING USING MULTI-CAMERA SYSTEM

(71) Applicant: Seagate Technology LLC, Fremont, CA (US)

(72) Inventors: Naman Sharma, Shugart (SG); Yu Qiang, Shugart (SG); Hock Soon Lim, Shugart (SG); Saravanan Nagarajan, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 175 days.

(21) Appl. No.: 16/914,007

(22) Filed: Jun. 26, 2020

(65) Prior Publication Data
US 2021/0407108 A1   Dec. 30, 2021

(51) Int. Cl.
| | | |
|---|---|---|
| *G06T 7/292* | (2017.01) | |
| *G06T 7/246* | (2017.01) | |
| *G06V 40/16* | (2022.01) | |

(52) U.S. Cl.
CPC ............. *G06T 7/292* (2017.01); *G06T 7/248* (2017.01); *G06V 40/166* (2022.01); *G06T 2207/10016* (2013.01); *G06T 2207/30201* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 8,953,843 | B1* | 2/2015 | Kwan | G06V 20/52 |
| | | | | 382/103 |
| 2005/0271250 | A1* | 12/2005 | Vallone | H04N 5/781 |
| | | | | 382/103 |
| 2009/0141940 | A1* | 6/2009 | Zhao | G06V 20/40 |
| | | | | 382/103 |
| 2016/0139977 | A1* | 5/2016 | Ashani | G06N 3/08 |
| | | | | 714/26 |
| 2019/0065825 | A1* | 2/2019 | Kuo | G06T 7/248 |
| 2019/0205694 | A1* | 7/2019 | Wang | G06V 40/171 |
| 2020/0097995 | A1 | 3/2020 | Bissland | |
| 2020/0098114 | A1 | 3/2020 | Kudriashov et al. | |
| 2020/0098116 | A1 | 3/2020 | Rozner et al. | |
| 2021/0357649 | A1* | 11/2021 | Adam | G06V 20/53 |

* cited by examiner

*Primary Examiner* — Idowu O Osifade
(74) *Attorney, Agent, or Firm* — Holzer Patel Drennan (57) ABSTRACT

Technology disclosed herein provides an object tracking multi-camera system including a plurality of cameras to capture images of one or more objects and one or more pattern recognition modules, each of the pattern recognition modules configured to identify an object in a video frame using pattern recognition and assigning a tracking number to the identified object, collect a plurality of object frames related to the identified object and associating the plurality of object frames to the assigned tracking number, compare a newly obtained object frame with the plurality of object frames related to the identified object to determine if the newly obtained object frame is related to the identified object, and in response to the comparison determine that facial recognition does not need to be performed on the newly obtained object frame.

20 Claims, 5 Drawing Sheets

OBJECT TRACKING USING MULTI-CAMERA SYSTEM

BACKGROUND

Video surveillance systems are a valuable security resource for many facilities. In particular, advances in camera technology have made it possible to install video cameras in an economic fashion to provide robust video coverage to facilities to assist security personnel in maintaining site security. Such video surveillance systems may also include recording features that allow for incident investigation and may assist entities to provide more robust security, allow for valuable analytics, or to assist in investigations.

While advances in video surveillance technology has increased the capabilities and prevalence of such systems, a number of drawbacks continue to exist that limit the value of these systems. For instance, while camera technology has drastically improved, the amount of data generated by such systems continues to increase. In turn, effective management of video surveillance data has become increasingly difficult. Proposed approaches for management of video surveillance systems include use of a network video recorder to capture and store video data or use of an enterprise server for video data management. As will be explained in greater detail below, such approaches each present difficulties. Accordingly, the need for improved video surveillance systems with robust video data management and access are needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, technology disclosed herein provides an object tracking multi-camera system including a plurality of cameras to capture images of one or more objects and one or more pattern recognition modules, each of the pattern recognition modules configured to identify an object in a video frame using pattern recognition and assigning a tracking number to the identified object, collect a plurality of object frames related to the identified object and associating the plurality of object frames to the assigned tracking number, compare a newly obtained object frame with the plurality of object frames related to the identified object to determine if the newly obtained object frame is related to the identified object, and in response to the comparison determine that facial recognition does not need to be performed on the newly obtained object frame.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

The technology disclosed herein pertains to an architecture that allows tracking objects within a multi-camera tracking system and real-time facial identification of the objects with lower facial identification resource utilization. Specifically, the technology contemplates (a) associating tracking information to various detected objects; (2) detecting new objects within bounding boxes; (3) comparing the objects within the bounding boxes to previously tracked objects; and (4) based on the comparison, either associating the new object with previously tracked objects or performing a facial recognition. This results in lower number of new facial recognitions that need to be performed by the system.

Specifically, the technology disclosed herein provides a method for exploiting spatiotemporal coherence for inexpensive multi-object multi-camera tracking in real time to solve the problem of expensive object recognition, identification and tracking in a video by combining expensive facial/pattern recognition and inexpensive tracking instead of using monolithic facial/pattern recognition methods. An implementation of the multi-camera object tracking system disclosed herein provides a common architecture that allows for both tracking of objects and identifying them not just by a unique identification (ID), but a unique ID that is related to an external information database (e.g., employee database, license plate database, etc.). An implementation disclosed herein achieves this by performing facial or pattern recognition on high resolution images and performing tracking on low resolution images, resulting in reduced use of computation resources. Specifically, the multi-camera object tracking system uses comparatively inexpensive tracking methods to do away with the need to performing facial/pattern recognition at every time step. Furthermore, various cameras of the multi-camera object tracking system share information about the identity of the objects being tracked.

An implementation of the multi-camera object tracking system disclosed herein interleaves facial recognition and inexpensive tracking to perform real-time human identification and tracking. The resulting solution improves existing person identification and tracking systems in terms of speed as well as accuracy. In one or more implementations disclosed herein, the use of both facial/pattern recognition and object tracking is combined to provide a more robust and real time solution. The resulting computational efficiency of the technology disclosed herein allows it to be implemented on edge devices with dedicated hardware. Furthermore, this technology provides for inter-camera communication to improve reliability and to reduce errors that my result from noise, occlusion, etc.

Figure 1:
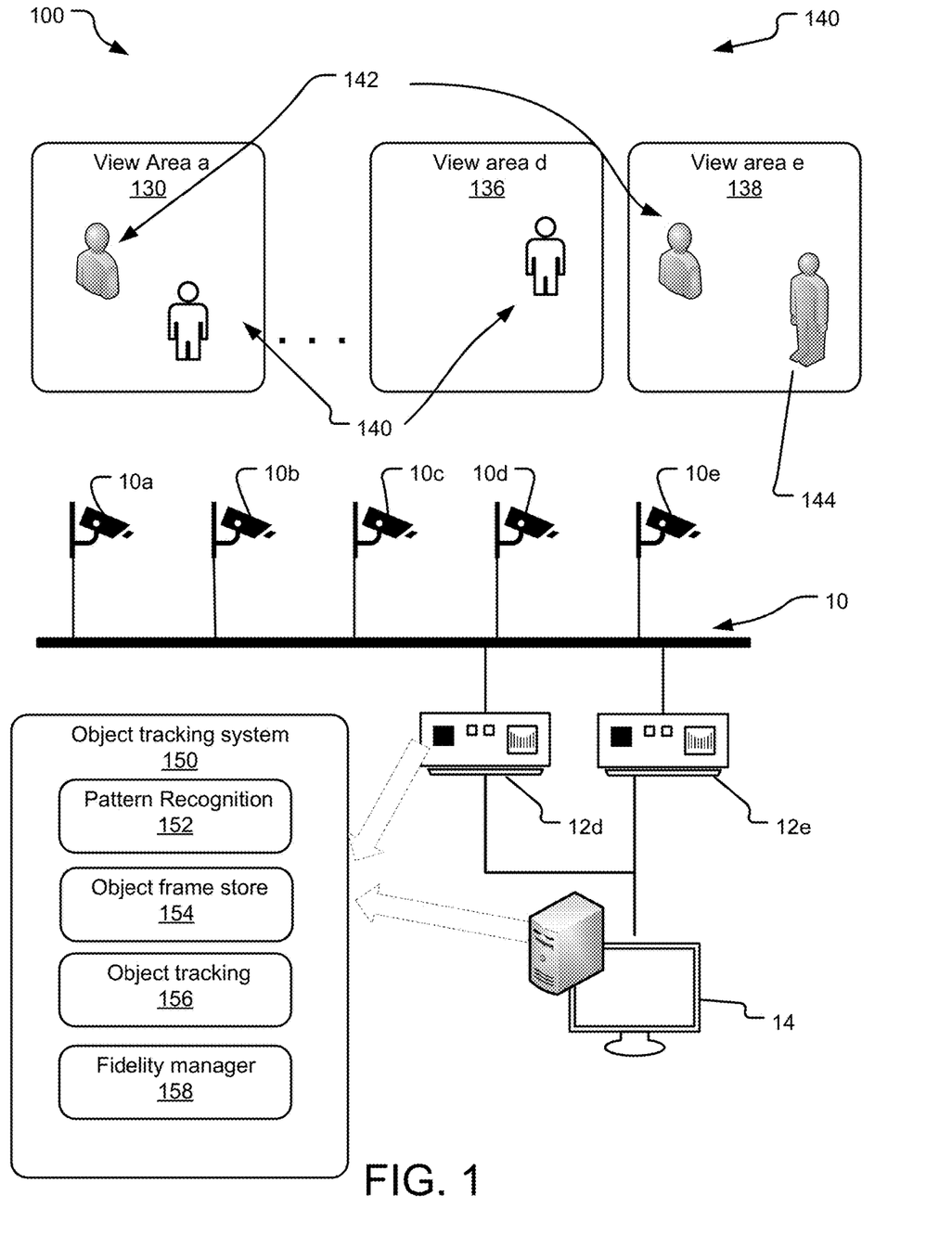
FIG. 1 illustrates an example block diagram of an example system for tracking objects in a multi-camera system.

FIG. 1 illustrates block diagram of an system for tracking objects in a multi-camera system 100. While the multi-camera system 100 is disclosed in context of tracking human objects, in alternative implementations, it can also be used to track other objects, such as vehicle license plates, etc. The multi-camera system 100 includes a network 10 of cameras, such as cameras 10a-10e. Each of the various cameras 10a-10e may be configured to monitor various view areas. For example, camera 10a monitors a view area a 130, a camera 10d monitors a view area d 136, a camera 10e monitors a view area d 138, etc.

Each of the cameras 10a-10e may be communicatively connected to a computing device 12. Thus, for example, the camera 10d is connected to a computing device 12d and the camera 10e is connected to a computing device 12e. While in the illustrated implementation, the computing devices 12 are shown to be separate from the cameras 10, in alternative implementations, the capabilities of the computing devices 12 may be built into the cameras 10. Furthermore, the computing devices 12, whether stand-alone or part of the cameras 10 maybe communicatively connected to a server 14.

Each of the cameras 10 detect and tracks various objects in the views 130-138. For example, the camera 10a may detect movement of persons 140, 142 in the view area a 130. The person 140 may move from the view area a 130 to the view area d 136, where it is detected by the camera 10d. Similarly, a person 142 may move from the view area a 130 to the view area e 138, where the camera 10e detects both the person 142 and a person 144. When a camera detects a person, or another object, in a view area, its images is captured, and a bounding box is around the object is generated. For example, the camera 10d and its associated computing device 12d captures images of person 140 in view area d 136 generates a bounding box around the person 140. In an alternative implementation, when facial recognition is to be performed, a bounding box may also be generated around the face of the person 140.

The resolution of the entire frame including image of the person 140 may be reduced and such reduced resolution frame and one or more bounding boxes therein may be used to generate an identity of the person 142. Subsequently, such identity is compared with various identities saved in a tracking database to see if person 142 is already in the tracking database. If so, no facial or pattern recognition is performed for the person 142 and the person 142 is tracked using the identity assigned to that person in the tracking database. On the other hand, if it is determined that the person 142 is not in the tracking database, a pattern recognition module performs pattern recognition or facial recognition of the person 142 and assigns it a new tracking identity.

Various software or firmware modules used by the multi-camera object tracking system 100 are disclosed as an object tracking system 150. One or more modules of the object tracking system 150 may be implemented either on the server 140 or on the computing devices 12 (and therefore, on the cameras 10). For example, a pattern recognition module 152, which may be a facial recognition module when the objects are persons, may be implemented on the server 14. Similarly, the object frame store 152 that stores various objects and their identifications may also be configured on the server 14.

On the other hand, an object tracking module 156 may be implemented on the computing devices 12. The cameras 10 and the computing devices 12 share information about the objects in the viewing areas, such as bounding box information, tracking information, etc. with each other via a network or using the server 14. In one implementation, the object tracking system 150 also includes a fidelity manager module 158 that is configured to re-perform pattern recognition of the objects at predetermined time intervals. Specifically, the fidelity manager module 158 ensures that objects are associated with the correct tracking identifications by performing pattern/facial recognition at such predetermined time intervals. In one implementation, the predetermined time interval may be based on various other factors, such as how many objects are in various view areas 130-138, the speed of various objects in the view areas 130-138, presence of any alarm, etc. For example, if the fidelity manager 158 determines that the view area a 130 is quite busy, it may increase the frequency of how often pattern recognition is performed so as to ensure accuracy of tracking. Similarly, the predetermined time interval maybe based on time of day. For example, given that the view areas 130-138 are more busy in the morning, during lunch hour, and in the evening, during these time periods, the fidelity manger 158 may assign higher frequency to pattern recognition of the objects.

Figure 2:
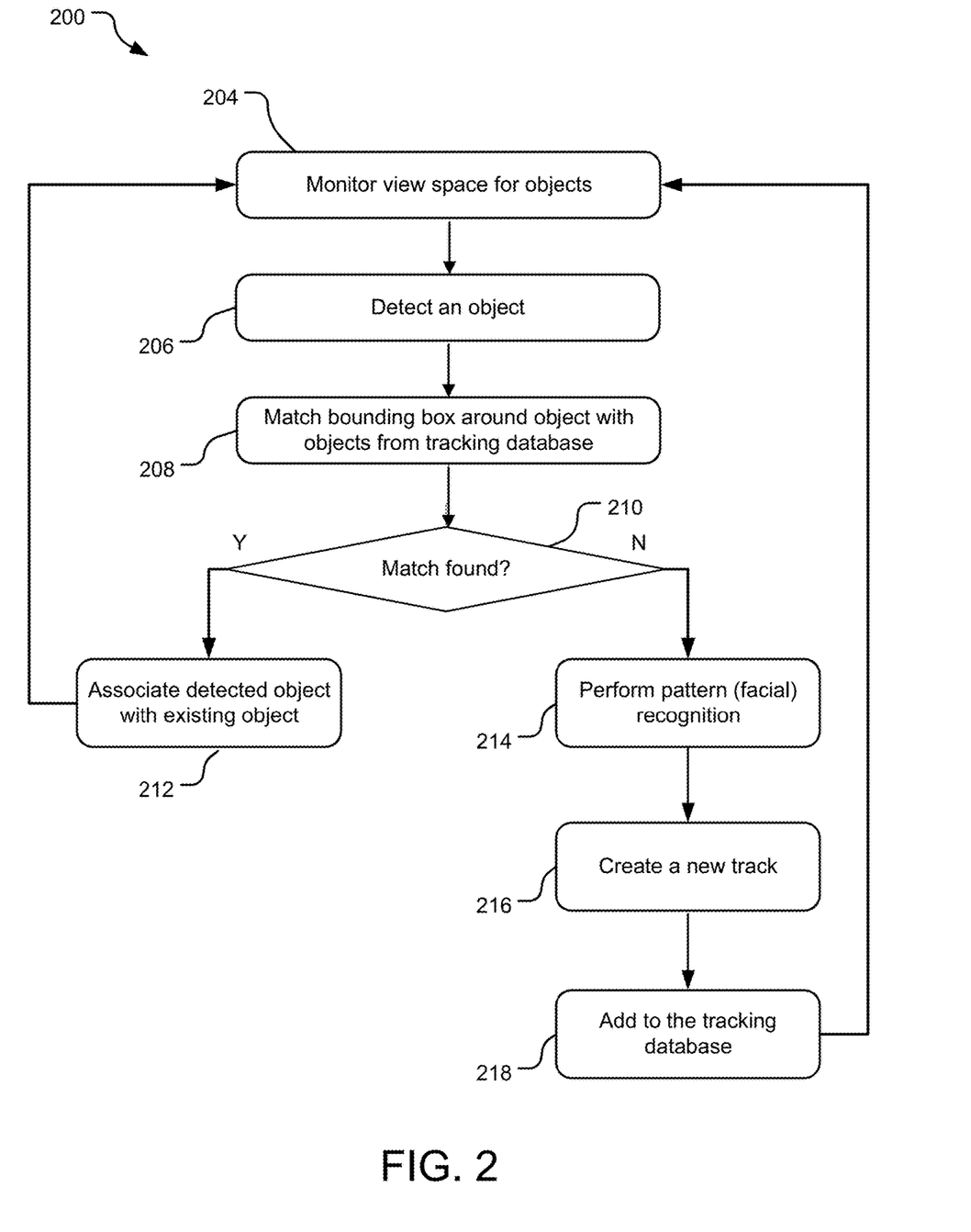
FIG. 2 illustrates example operations for the system for tracking objects in a multi-camera system.

FIG. 2 illustrates operations 200 for the system for tracking objects in a multi-camera system. An operation 204 monitors a view space for objects. For example, the view space may be a server facility, a front lobby of a building, etc. An operation 206 may detect an object in the view space. For example, such an object may be a person, John Doe. Subsequently, an operation 208 captures a bounding box around the detected object, generates a representative vector for the bounding box, and compares the representative vector with existing objects from a tracking database. Thus, in representative vector may be generated based on a bounding box around face of John Doe. In one implementation, the vector may be calculated using a neural network. Furthermore, comparison between two vectors may be performed based on the similarity of the vectors, which may be determined based on the distance between various vectors. Specifically, such measuring of similarity between different vectors allows to find a match even when various vectors are generated based on images from different views of the same person that may be taken at different angels, distances, etc., which may result in slightly differing representative vectors.

If such as match is found at an operation 210, an operation 212 associates the detected object with object and assigns it a tracking id of the existing object. For example, if John Doe already has a tracking ID in the tracking database, such existing tracking ID is associated with the bounding box for John Doe. If the operation 210 determines that no match is found for the representative vector for John Doe, an operation 214 performs pattern recognition for John Doe. In this case, a new track is created for John Doe at operation 216 and an operation 218 adds the vector representing John Doe with the tracking ID in the tracking database.

Figure 3:
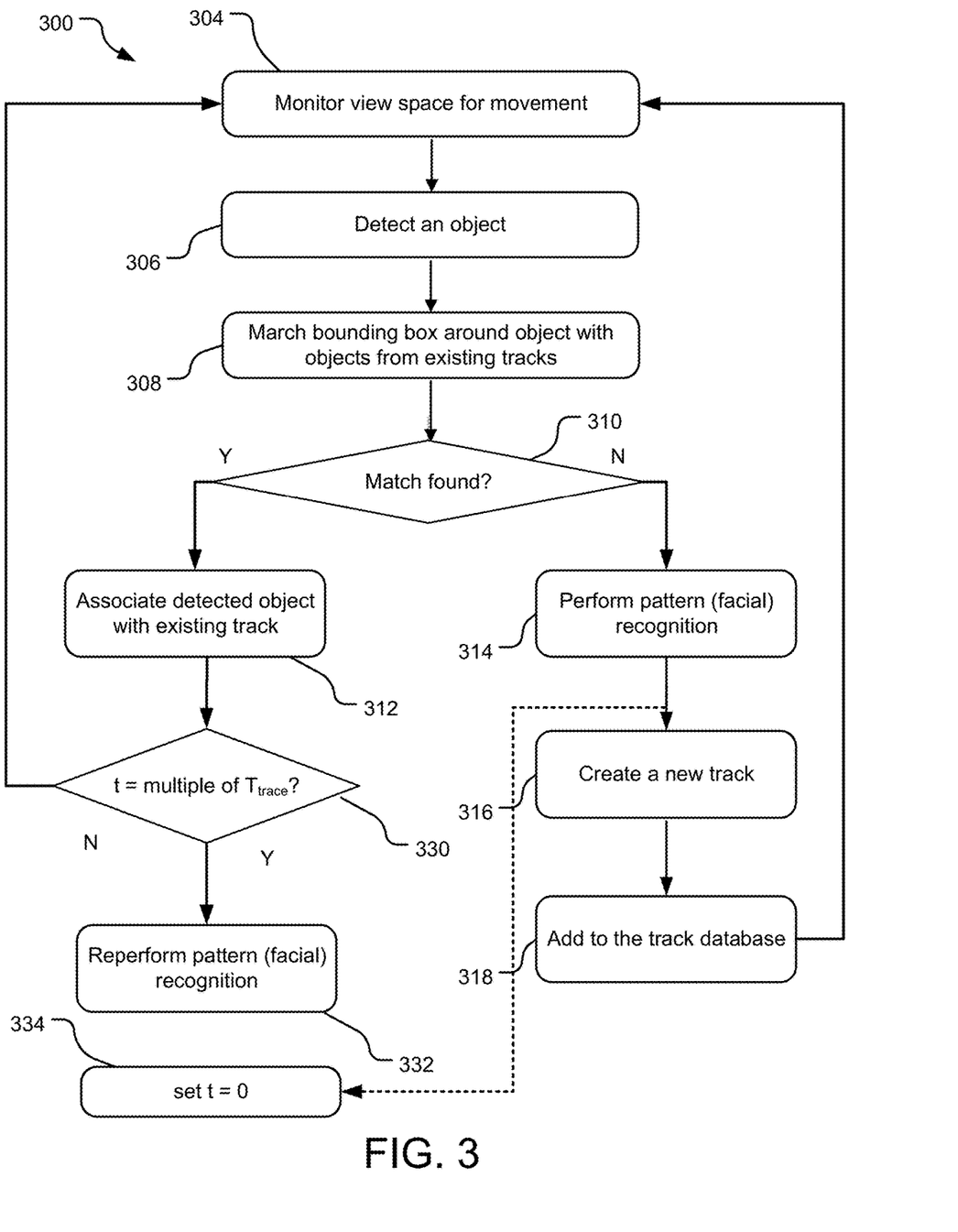
FIG. 3 illustrates example operations for another implementation of the system for tracking objects in a multi-camera system.

FIG. 3 illustrates operations 300 for another implementation of the system for tracking objects in a multi-camera system. Specifically, various operations 304-318 are substantially similar to the operations 204-208 discussed above with respect to FIG. 2. Additionally, the implementation disclosed in FIG. 3 includes an operation 330 that evaluates if it is necessary to re-perform pattern recognition. For example, t may be set to 0 at operation 334 when a pattern recognition is performed on an object. The operation 330 determines if the current time t is a multiple of a $T_{trace}$ (a predetermined time period). If so, an operation 332 reperforms pattern recognition on the object.

Figure 4:
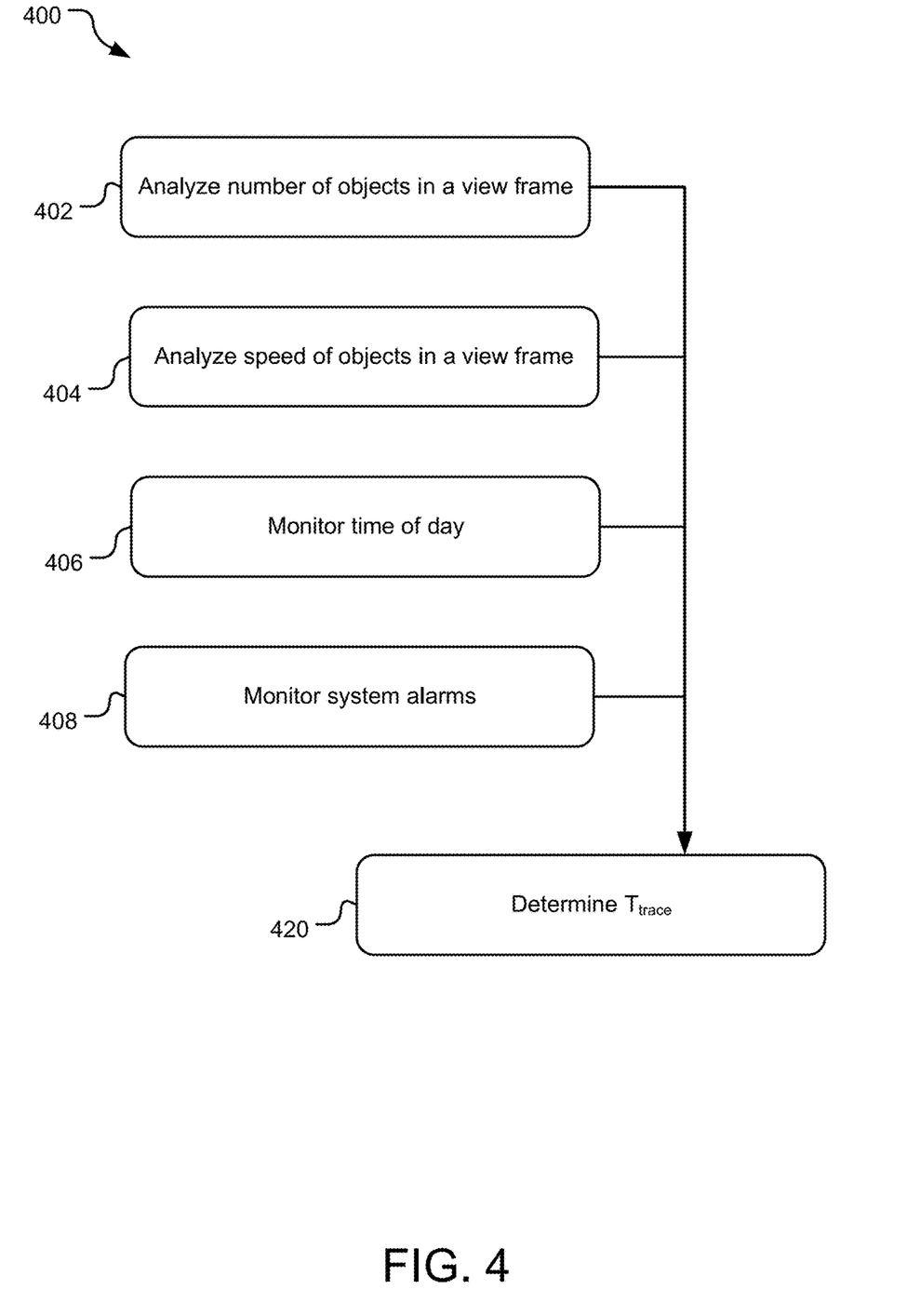
FIG. 4 illustrates example operations for yet another implementation of the system for tracking objects in a multi-camera system.

FIG. 4 illustrates operations 400 for yet another implementation of the system for tracking objects in a multi-camera system. Specifically, the operations 400 provide various manners in which the predetermined time $T_{trace}$ may be determined to ensure fidelity of the pattern recognition for various objects in the multi-camera object tracking system disclosed herein. Specifically, an operation 402 may analyze the number of objects in a view frame and provide that information to a determining operation 420. The determining operation 420 may use this information to determine $T_{trace}$. Similarly, an operation 404 may analyze the speed of objects in a view frame and provide that information to a determining operation 420. The determining operation 420 may use this information to determine $T_{trace}$. Alternatively, the determining operation 420 may use the time of day as provided by an operation 406 to determine $T_{trace}$. On the other hand, an operation 408 may monitor system alarms and if an alarm is detected, and the determining operation 420 may update $T_{trace}$ in response to presence of an alarm signal.

The architecture disclosed above may be agnostic to the methods used to perform facial/pattern recognition for objects and object tracking. Furthermore, the architecture can also be extended to identification and tracking of any object which has a sub-set that can be uniquely identified, such as car and license plates, etc. Furthermore, in one implementation, to account for the changes in appearance of persons or objects, multiple feature vectors from different points in time are used and updated so the relatively recent characteristics of the persons or objects are recognized. In an alternative implementation, facial recognition also includes identification of key points of face.

Figure 5:
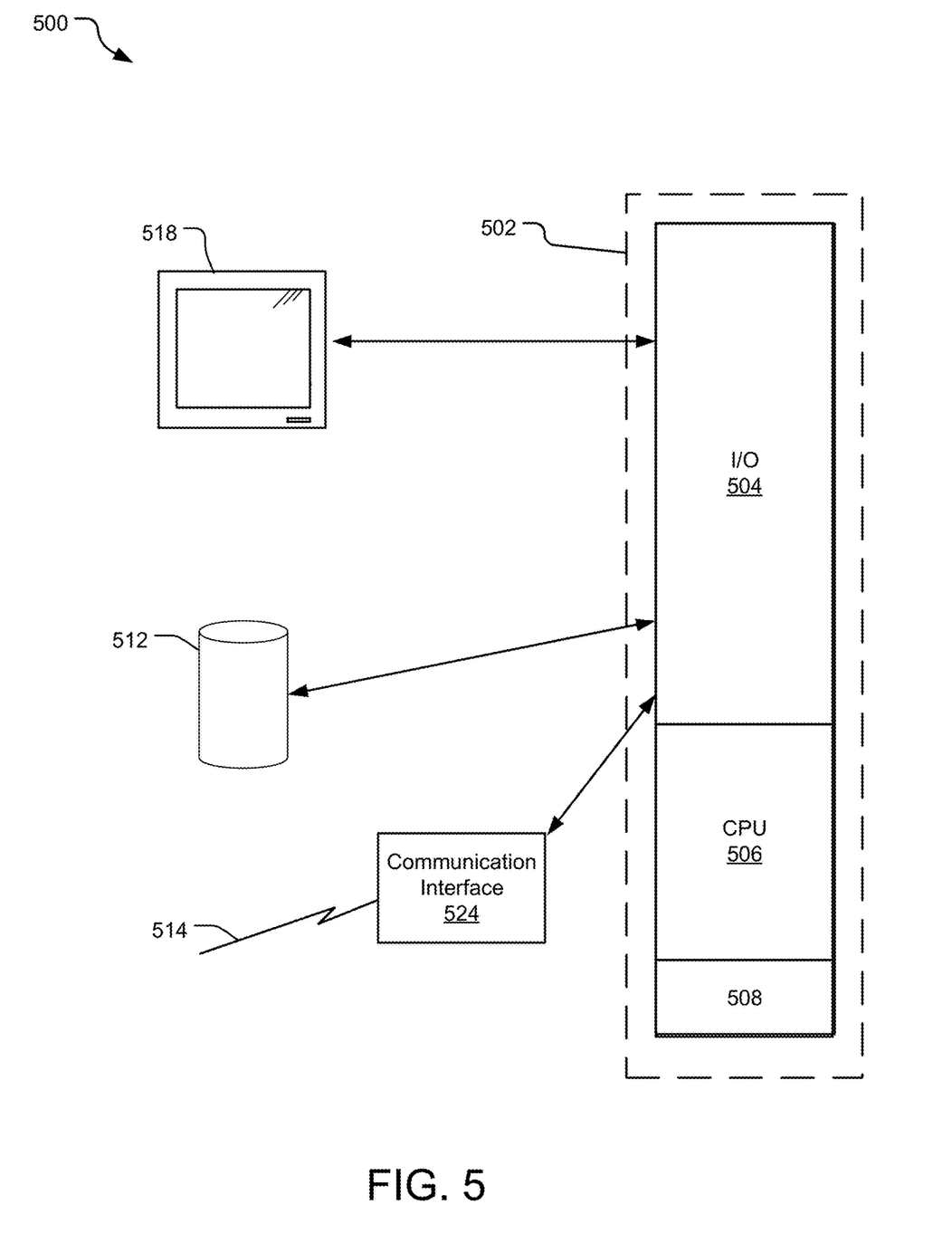
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs, GPUs, or VPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   identifying an object in a video frame using pattern recognition and assigning a tracking number to the identified object;
   collecting a plurality of object frames associated with the identified object and associating the plurality of object frames to the assigned tracking number;
   comparing a low image resolution version of a newly obtained object frame with the plurality of object frames related to the identified object to determine if the newly obtained object frame is related to the identified object; and
   in response to the comparison, determining that facial recognition does not need to be performed on a high image resolution version of the newly obtained object frame, the image resolution of the high image resolution version being higher than the image resolution of the low image resolution version.

2. The method of claim 1, further comprising performing pattern recognition of one or more object frames associated with the identified object at a predetermined time interval.

3. The method of claim 2, wherein the predetermined time interval is based on the number of objects in a frame.

4. The method of claim 2, wherein the predetermined time interval is based on speed of movement of one or more objects in a frame.

5. The method of claim 2, wherein the predetermined time interval is based on day of time.

6. The method of claim 2, wherein the predetermined time interval is based on an alarm signal indicating security threat.

7. The method of claim 1, wherein comparing the low image resolution version of the newly obtained object frame with the plurality of object frames related to the identified object further comprising comparing the low image resolution version of the newly obtained object frame with plurality of object frames related to a plurality of identified objects.

8. The method of claim 1, further comprising adding the low image resolution version of the newly obtained object frame into the plurality of object frames associated with the identified object.

9. One or more processor-readable storage media devices encoding processor-executable instructions for executing on a computer system a computer process, the computer process comprising:
   identifying an object in a video frame using pattern recognition and assigning a tracking number to the identified object;
   collecting a plurality of object frames related to the identified object and associating the plurality of object frames to the assigned tracking number;
   comparing a low image resolution version of a newly obtained object frame with the plurality of object frames related to the identified object to determine if the newly obtained object frame is related to the identified object; and
   in response to the comparison, determining that facial recognition does not need to be performed on a high image resolution version of the newly obtained object frame, the image resolution of the high image resolution version being higher than the image resolution of the low image resolution version.

10. The one or more processor-readable storage media devices of claim 9, wherein the computer process further comprising performing pattern recognition of one or more object frames associated with the identified object at a predetermined time interval.

11. The one or more processor-readable storage media devices of claim 10, wherein the predetermined time interval is based on the number of objects in a frame.

12. The one or more processor-readable storage media devices of claim 10, wherein the predetermined time interval is based on speed of movement of one or more objects in a frame.

13. The one or more processor-readable storage media devices of claim 10, wherein the predetermined time interval is based on day of time.

14. The one or more processor-readable storage media devices of claim 10, wherein the predetermined time interval is based on an alarm signal indicating security threat.

15. The one or more processor-readable storage media devices of claim 9, wherein comparing the low image resolution version of the newly obtained object frame with the plurality of object frames related to the identified object further comprising comparing the low image resolution version of the newly obtained object frame with plurality of object frames related to a plurality of identified objects.

16. The one or more processor-readable storage media devices of claim 9, wherein the computer process further comprising adding the low image resolution version of the newly obtained object frame into the plurality of object frames associated with the identified object.

17. A system comprising:
- a plurality of cameras to capture images of one or more objects;
- one or more pattern recognition modules, each of the pattern recognition modules configured to:
  - identify an object in a video frame using pattern recognition and assigning a tracking number to the identified object;
  - collect a plurality of object frames related to the identified object and associating the plurality of object frames to the assigned tracking number;
  - compare a low image resolution version of a newly obtained object frame with the plurality of object frames related to the identified object to determine if the newly obtained object frame is related to the identified object; and
  - in response to the comparison, determine that facial recognition does not need to be performed on a high image resolution version of the newly obtained object frame, the image resolution of the high image resolution version being higher than the image resolution of the low image resolution version.

18. The system of claim 17, wherein the each of the pattern recognition modules configured to is further configured to perform pattern recognition of one or more object frames associated with the identified object at a predetermined time interval.

19. The system of claim 17, wherein comparing the low image resolution version of the newly obtained object frame with the plurality of object frames related to the identified object further comprising comparing the newly obtained object frame with plurality of object frames related to a plurality of identified objects.

20. The system of claim 17, wherein the each of the pattern recognition modules is further configured to add the low image resolution version of the newly obtained object frame into the plurality of object frames associated with the identified object.

* * * * *